(12) United States Patent
Yu

(10) Patent No.: US 11,915,078 B2
(45) Date of Patent: Feb. 27, 2024

(54) DISPLAY PANEL, DISPLAY SCREEN, AND ELECTRONIC APPARATUS

(71) Applicant: WUHAN CHINA STAR OPTOELECTRONICS TECHNOLOGY CO., LTD., Hubei (CN)

(72) Inventor: Pengfei Yu, Hubei (CN)

(73) Assignee: WUHAN CHINA STAR OPTOELECTRONICS TECHNOLOGY CO. LTD., Hubei (CN)

( * ) Notice: Subject to any disclaimer, the term of this patent is extended or adjusted under 35 U.S.C. 154(b) by 826 days.

(21) Appl. No.: 17/041,069

(22) PCT Filed: Jul. 21, 2020

(86) PCT No.: PCT/CN2020/103210
§ 371 (c)(1),
(2) Date: Sep. 24, 2020

(87) PCT Pub. No.: WO2022/000606
PCT Pub. Date: Jan. 6, 2022

(65) Prior Publication Data
US 2021/0406624 A1 Dec. 30, 2021

(30) Foreign Application Priority Data
Jun. 28, 2020 (CN) .......................... 202010598332.X

(51) Int. Cl.
*G02F 1/1333* (2006.01)
*G02F 1/1339* (2006.01)
*G06K 19/06* (2006.01)

(52) U.S. Cl.
CPC ..... *G06K 19/06046* (2013.01); *G02F 1/1339* (2013.01); *G02F 1/13394* (2013.01); *G02F 1/133374* (2021.01)

(58) Field of Classification Search
CPC .......... G02F 1/133308; G02F 1/13394; G02F 1/1339; G02F 1/133374; G06K 19/06046
See application file for complete search history.

(56) References Cited

U.S. PATENT DOCUMENTS 10,268,082 B2 * 4/2019 Yu .......................... G02F 1/1339
2017/0102582 A1 * 4/2017 Li ...................... G02F 1/133516
(Continued)

FOREIGN PATENT DOCUMENTS

| CN | 104849901 A | 8/2015 |
| CN | 105445986 A | 3/2016 |

(Continued)

*Primary Examiner* — Mariam Qureshi
(74) *Attorney, Agent, or Firm* — PV IP PC; Wei Te Chung; Zhigang Ma

(57) ABSTRACT

A display panel, a display screen, and an electronic apparatus are provided. Wherein, the display panel includes a first limiting part and a second limiting part, wherein the first limiting part and the second limiting part are configured to limit an identification pattern within a preset region; a first sealing part disposed between the first limiting part and the second limiting part and disposed on a first side of the identification pattern; and a first vacuum area disposed on a second side of the identification pattern.

20 Claims, 4 Drawing Sheets

(56) References Cited

U.S. PATENT DOCUMENTS

| | | |
|---|---|---|
| 2017/0170247 A1 | 6/2017 | Kim |
| 2018/0040643 A1 | 2/2018 | Lu et al. |
| 2018/0107034 A1 | 4/2018 | Yu |
| 2019/0155075 A1 | 5/2019 | Deng |

FOREIGN PATENT DOCUMENTS

| | | |
|---|---|---|
| CN | 205318069 U | 6/2016 |
| CN | 107039601 A | 8/2017 |
| CN | 107918231 A | 4/2018 |
| CN | 207571430 U | 7/2018 |
| JP | 2014240853 A | 12/2014 |
| KR | 20040049934 A | 6/2004 |
| KR | 20180047556 A | 5/2018 |

\* cited by examiner

US 11,915,078 B2

DISPLAY PANEL, DISPLAY SCREEN, AND ELECTRONIC APPARATUS

FIELD OF INVENTION

The present application relates to the field of display technology, and specifically to a display panel, a display screen, and an electronic apparatus.

BACKGROUND OF INVENTION

An identification pattern is usually located on display panels to facilitate identification of the display panels. In order to ensure that a scan apparatus can effectively identify the identification pattern, a shading film layer positionally corresponding to the identification pattern in the display panels is usually removed, so that a position of the display panel corresponding to an identification pattern area forms a cavity. With continual development of display panels, thicknesses of the display panels have become increasingly thinner.

However, as the thicknesses became thinner, rigidity of a substrate decreases, which leads to the substrate corresponding to the identification pattern being depressed inward under a suction effect of the cavity during vacuum suction, and a degree of the depression positively correlates to a thickness of the substrate. When the depression reaches a certain degree, this area of substrate forms a concave lens effect, thereby interfering the scan apparatus to a certain degree, which leads to inability to identify the identification pattern.

SUMMARY OF INVENTION

Embodiments of the present application provide a display panel, a display screen, and an electronic apparatus, and can decrease interference to a scan apparatus, thereby effectively identifying an identification pattern.

Embodiments of the present application provide a display panel that includes:

A first substrate including:

A first underlay substrate including a first sub-part; and

A functional layer disposed on the first sub-part and including an identification pattern;

A second substrate disposed opposite to the first substrate;

A first limiting part and a second limiting part disposed between the first substrate and the second substrate, wherein the first limiting part is disposed on one of two sides of the identification pattern, the second limiting part is disposed on the other of the two sides of the identification pattern, and the first limiting part and the second limiting part are configured to limit the identification pattern within a preset region;

A first sealing part disposed between the first limiting part and the second limiting part and disposed on a first side of the identification pattern; and A first vacuum area disposed on a second side of the identification pattern.

The present invention further provides a display screen that includes the above described display panel.

The present invention further provides an electronic apparatus that includes the above-mentioned display screen.

A display panel, a display screen, and an electronic apparatus according to embodiments of the present application include a first substrate that includes a first underlay substrate including a first sub-part; and a functional layer disposed on the first sub-part and including an identification pattern; a second substrate disposed opposite to the first substrate; a first limiting part and a second limiting part disposed between the first substrate and the second substrate, wherein the first limiting part is disposed on one of two sides of the identification pattern, the second limiting part is disposed on the other of the two sides of the identification pattern, and the first limiting part and the second limiting part are configured to limit the identification pattern within a preset region; a first sealing part disposed between the first limiting part and the second limiting part and disposed on a first side of the identification pattern; and a first vacuum area disposed on a second side of the identification pattern. Because a fulcrum effect occurs at an area between the first vacuum area and the first sealing part, glass where the identification pattern is located can be prised to reduce the degree the substrate depressing inward during suction, and to reduce interference to a scan apparatus, thereby effectively identifying the identification pattern.

DESCRIPTION OF DRAWINGS

The accompanying figures to be used in the description of embodiments of the present application will be described in brief to more clearly illustrate the technical solutions of the embodiments. The accompanying figures described below are only part of the embodiments of the present application, from which figures those skilled in the art can derive further figures without making any inventive efforts.

DETAILED DESCRIPTION OF PREFERRED EMBODIMENTS

Figure 1:
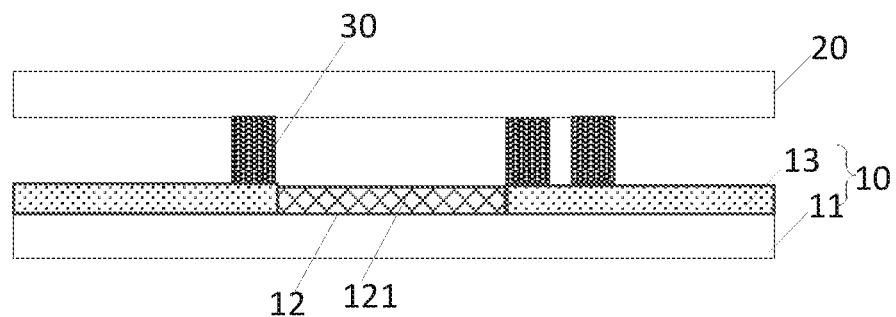
FIG. 1 is a sectional view of a conventional display panel.

The embodiments of the present invention are described in detail hereinafter. Examples of the described embodiments are given in the accompanying drawings. It should be noted that the following embodiments are intended to illustrate and interpret the present invention, and shall not be construed as causing limitations to the present invention. Similarly, the following embodiments are part of the embodiments of the present invention and are not the whole embodiments, and all other embodiments obtained by those skilled in the art without making any inventive efforts are within the scope protected by the present invention.

In description of embodiments of the present invention, it should be understood that terms that indicates orientation or relation of position such as "center", "longitudinal", "lateral", "length", "width", "thickness", "upper", "lower", "front", "rear", "left", "right", "vertical", "horizontal", "top", "bottom", "interior", "exterior" are based on orientation or relation of position accompanying drawings show. They are simply for purpose of description of the present invention and simplifying of description, and do not mean or suggest the devices or components have a specified orientation and constructed and operated in a specified orientation; therefore, it should not be understood as limitation of the present invention. Furthermore, terms "first" and "second" are used simply for purpose of description and cannot be understood to mean or suggest relative importance or implicitly mean amount of the technical features. Therefore, features with terms "first" and "second" can mean or implicitly include one or more of the features. In description of the present invention, "multiple" means two or more unless otherwise clearly and concretely specified.

In embodiments of the present invention, unless otherwise clearly defined or specified, terms such as "mount", "connect", "secure", etc. should be understood in a wide sense. For example, it can be fixedly connected, detachably connected, or one-piece; it can be mechanically connected or electrically connected; it can be directly connected or indirectly connected through an intermediate media; and it can be an internal connection of two devices or effect relation of two devices to each other, unless otherwise clearly specified. For a person of ordinary skill in the art, specific meaning of the above-mentioned terms in embodiments of the present invention can be understood according to specific conditions.

In the present application, unless otherwise clearly specified and limited, that a first feature is "on" or "below" a second feature can include that the first feature directly contacts the second feature, and also can include that the first feature contacts the second feature through other features between them rather than their direct contact. Furthermore, that a first feature is "on top of", "above", and "on an upper side of" a second feature includes that the first feature is on right top of and obliquely above the second feature, or merely means that a horizontal height of the first feature is greater than that of the second feature. That a first feature is "at a bottom of", "below", and "on an lower side of" a second feature includes that the first feature is at the right bottom of and obliquely below the second feature, or merely means that a horizontal height of the first feature is less than that of the second feature.

Contents disclosed below provide many different embodiments or examples to realize different structures according to the present application. For the purpose of simplifying description of the present application, contents below describe parts and configuration of specific examples. Naturally, they are merely for illustration and do not intend to limit the present application. Furthermore, reference numerals and/or letters can be repeated in different examples of the present application, and this repeat is for the purse of simplification and clearness, not indicating relations between various embodiments and/or configurations under discussion. Furthermore, the present application provides examples of various specific processes and materials; however, a person of ordinary skill in the art can think of applications of other processes and/or materials.

Figure 2:
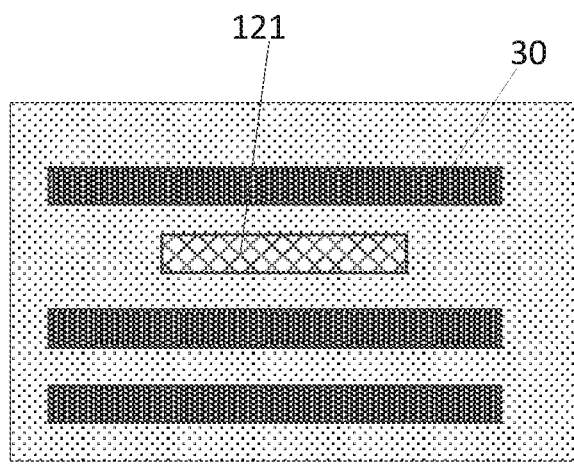
FIG. 2 is a top view of a conventional display panel.

As shown in FIG. 1 and FIG. 2, a conventional display panel includes a first substrate 10 and a second substrate 20, wherein the second substrate 20 is disposed opposite to the first substrate 10; a functional layer 12 disposed on a part of a first underlay substrate 11, wherein the functional layer 12 includes an identification pattern 121.

Three limiting parts 30 are disposed between the first substrate 10 and the second substrate 20, at least one limiting part 30 is disposed on each side of two sides of the identification pattern 121, the limiting parts 30 are configured to limit the identification pattern 121 within a preset region, and a number of the limiting parts 30 is not limited here.

Figure 3:
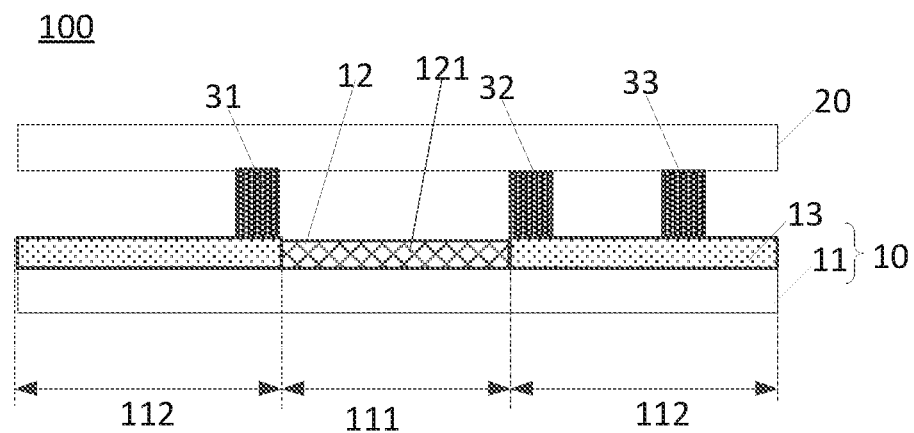
FIG. 3 is a sectional view of a display panel according to an embodiment of the present application.
Figure 4:
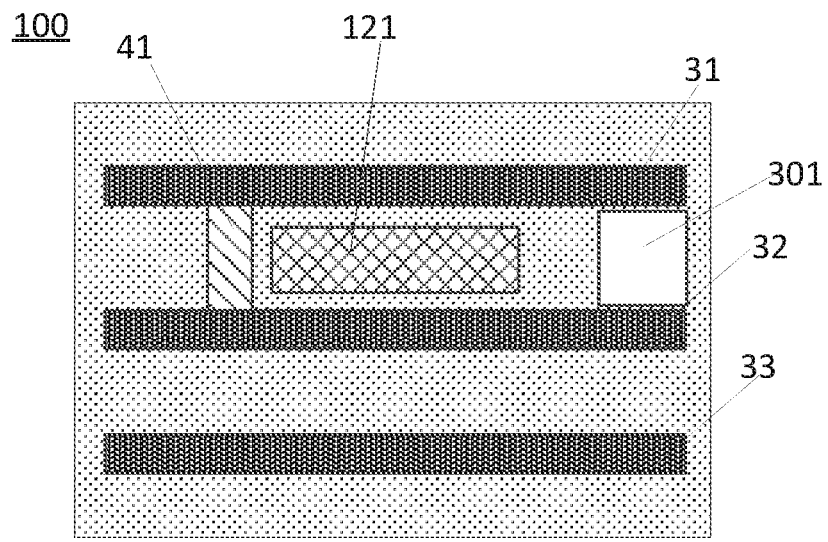
FIG. 4 is a top view of a display panel according to an embodiment of the present application.

Referring to FIG. 3 and FIG. 4, FIG. 3 is a sectional view of a display panel according to an embodiment of the present invention.

As shown in FIG. 3 and FIG. 4, a display panel 100 according to the present embodiment includes a first substrate 10, a second substrate 20, a first limiting part 31, a second limiting part 32, and a first sealing part 41.

The first substrate 10 includes a first underlay substrate 11 and a functional layer 12, and can further include a switch array layer 13, wherein the first underlay substrate 11 includes a first sub-part 111 and a second sub-part 112. A material of the first underlay substrate 11 can be a transparent material, and the material of the first underlay substrate 11 can be glass. The functional layer 12 is disposed on the first sub-part 111, the functional layer 12 includes an identification pattern 121, and the identification pattern 121 is configured to identify the display panel. Wherein, each display panel corresponds to one identification pattern 121, that is, each display panel has a unique identification pattern 121 to distinguish one display panel from others. In order to increase identification accuracy, a material of the functional layer 12 is a light shielding material. In one embodiment, the material of the functional layer 12 is not limited to metal and a black matrix material. The switch array layer 13 is disposed on the second sub-part 112.

The second substrate 20 is disposed opposite to the first substrate 10. In one embodiment, the first substrate 10 is an array substrate, and the second substrate 20 is a color filter substrate. In one embodiment, the second substrate 20 can include a second underlay substrate and a color filter layer disposed under the second underlay substrate. Obviously, it can be understood that a specific structure of the first substrate 10 and the second substrate 20 is not limited thereto.

The first limiting part 31 is disposed between the first substrate 10 and the second substrate 20, and the first limiting part 31 is disposed on one of two sides of the identification pattern 121.

The second limiting part 32 is also disposed between the first substrate 10 and the second substrate 20, the second limiting part 32 is disposed on the other of the two sides of the identification pattern 121, the first limiting part 31 and the second limiting part 32 are configured to limit the identification pattern 121 within a preset region, and the first limiting part 31 and the second limiting part 32 are configured to isolate the identification pattern 121 from exterior film layer and air. In one embodiment, an area of the preset area (not shown) is equal to an area where the identification pattern 121 is located, and at this time the first limiting part 31 and the second limiting part 32 located on two sides of the identification pattern 121 both abut a corresponding end of the identification pattern 121. In other embodiments, an area of the preset area can be greater than an area where the identification pattern 121 is located, and at this time the first limiting part 31 and the second limiting part 32 located on two sides of the identification pattern 121 are both disposed spacing from a corresponding end of the identification pattern 121. The preset area is an area between the first limiting part 31 and the second limiting part 32.

Referring to FIG. 4, the first sealing part 41 is disposed between the first limiting part 31 and the second limiting part 32, and the first sealing part 41 is disposed on a first side of the identification pattern 121, such as a left side. In an advantageous embodiment, a distance between the first sealing part 41 and the identification pattern 121 is less than a first preset value. That is, the distance between the first sealing part 41 and the identification pattern 121 is shorter.

A first vacuum area 301 is disposed on a second side of the identification pattern 121, such as a right side, that is, the first vacuum area 301 is disposed opposite to the first sealing part 41. In another embodiment, the first vacuum area 301 is disposed on a left side of the identification pattern 121, and the first sealing part 41 is disposed on a right side of the identification pattern. In an advantageous embodiment, an area of the first vacuum area 301 is less than that of the identification pattern 121, for example, can be half the identification pattern's 121 area. Obviously, the area of the first vacuum area 301 can be determined according to specific requirements.

Figure 5:
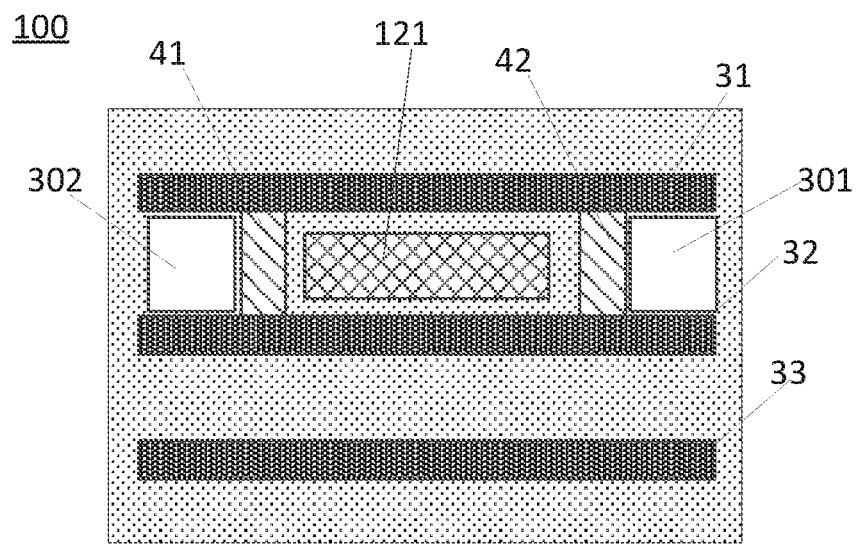
FIG. 5 is a top view of a display panel according to another embodiment of the present application.

In another embodiment, in order to prevent the identification pattern from being damaged to increase identification accuracy, as shown in FIG. 5, the display panel 100 further includes a second sealing part 42.

The second sealing part 42 is disposed between the first limiting part 31 and the second limiting part 32, and the second sealing part 42 is disposed between the identification pattern 121 and the first vacuum area 301. In one embodiment, in order to simplify manufacturing processes, decrease cost of production, and further prevent the identification pattern from being damaged, a material of the first sealing part 41 and a material of the second sealing part 42 are both a colloid. In an advantageous embodiment, a distance between the second sealing part 42 and the identification pattern 121 and a distance between the first sealing part 41 and the identification pattern 121 are both less than the first preset value. That is, the distance between the second sealing part 42 and the identification pattern 121 and that between the first sealing part 41 and the identification pattern 121 are both shorter.

In an advantageous embodiment, the first sealing part 41 and the second sealing part 42 are symmetrically disposed with respect to the identification pattern.

In another embodiment, in order to further prevent the first substrate or the second substrate from depressing inward, the display panel 100 further includes a second vacuum area 302.

The second vacuum area 302 is disposed on a side of the first sealing part 41 away from the identification pattern 121, that is, disposed on an outer side of the first sealing part 41. In an advantageous embodiment, the first vacuum area 301 and the second vacuum area 302 are symmetrically disposed with respect to the identification pattern 121. In an advantageous embodiment, a sum of an area of the second vacuum area 302 and an area of the first vacuum area 301 is equal to an area of the identification pattern 121. In an advantageous embodiment, the area of the second vacuum area 302 is less than that of the identification pattern 121, for example, can be half the identification pattern's 121 area. Obviously, the area of the second vacuum area 302 can be determined according to specific requirements.

In another embodiment, the display panel 100 can further include a third limiting part 33 disposed between the first substrate 10 and the second substrate 20, wherein the third limiting part 33 is disposed on one side of the second limiting part 32 away from the identification pattern 121. In other embodiments, the third limiting part 33 can also be disposed on one side of the first limiting part 31 away from the identification pattern 121.

Figure 6:
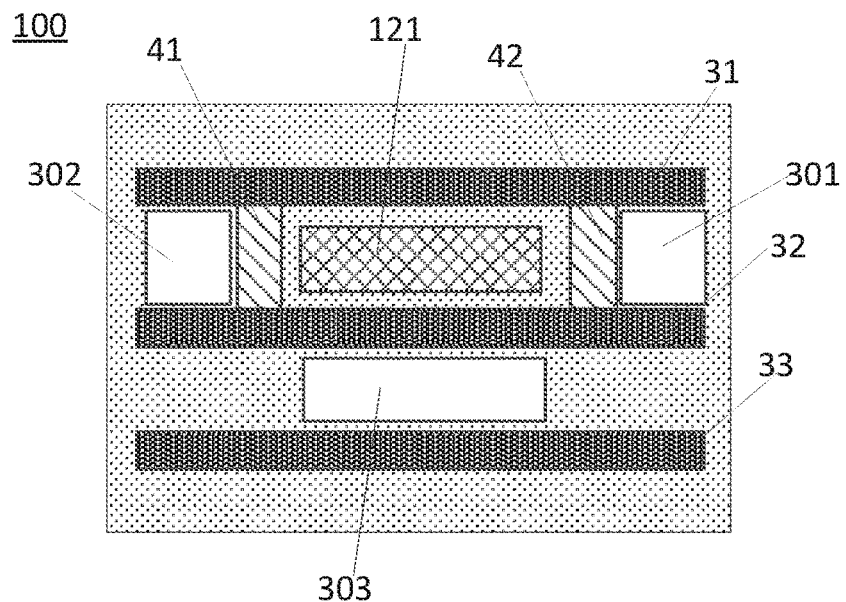
FIG. 6 is a top view of a display panel according to still another embodiment of the present application.

Referring to FIG. 6, there is a third vacuum area 303 between the third limiting part 33 and the second limiting part 32, and a position of the third vacuum area 303 corresponds to a position of the identification pattern 121. In one embodiment, in order to further prevent the first substrate or the second substrate from depressing inward, a difference between an area of the third vacuum area 303 and an area of the identification pattern 121 is less than a preset area, that is, the area of the third vacuum area 303 is approximately equal to or equal to the area of the identification pattern 121. The preset area approximates zero.

In one embodiment, in order to further prevent the first substrate or the second substrate from depressing inward, a distance between the third limiting part 33 and the second limiting part 32 is greater than or equal to a preset distance, and the preset distance is a distance between the first limiting part 31 and the second limiting part 32.

Figure 7:
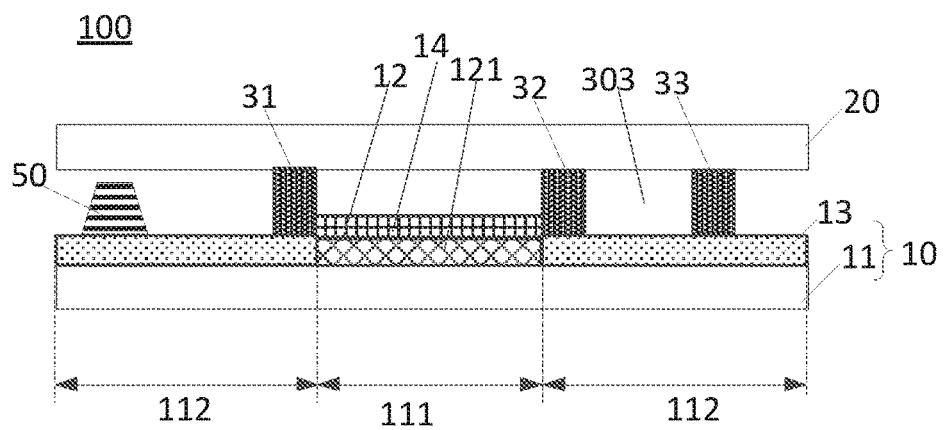
FIG. 7 is a sectional view of a display panel according to another embodiment of the present application.

In one embodiment, in order to simplify manufacturing processes and decrease cost of production, the first limiting part 31, the second limiting part 32, and the third limiting part 33 are disposed in a same layer and have a same material. In one embodiment, as shown in FIG. 7, in order to simplify manufacturing processes and decrease cost of production, the display panel further includes a spacer 50. The first limiting part 31, the second limiting part 32, and the third limiting part 33 are disposed in a same layer as the spacer 50, and they have a same material. That is, the limiting parts and the spacer 50 are obtained through a same manufacturing process. Obviously, a manufacturing process of the first limiting part 31 is not limited thereto. A material of the first limiting part 31 includes at least one of SiNx or SiOx. A material of the first limiting part 31 is advantageously an organic insulating material. A material of the rest of the limiting parts is the same.

It can be understood that a place between the first substrate 10 and the second substrate 20 corresponding to the first vacuum area 301, the second vacuum area 302, and the third vacuum area does not have a liquid crystal layer or other film layers disposed, that is, a blank area.

It can be understood that a number of the limiting parts is not limited thereto, and it can be greater than or equal to three.

In another embodiment, as shown in FIG. 7, the difference between a display panel of the present embodiment and that of the previous embodiment is that a protection layer 14 can further be disposed above the identification pattern 121, and the protection layer 14 is configured to prevent the identification pattern 121 from being damaged.

Wherein, a material of the protection layer 14 is also a transparent organic material. The protection layer 14 can have a buffer effect.

It can be understood that FIG. 3 to FIG. 7 show only structural schematic diagrams of one embodiment, and do not limit the present invention.

When the first vacuum area experiences vacuum suction, the first substrate and the second substrate depress inward, and the sealing part acts to produce a support effect. Because a fulcrum effect occurs at an area between the vacuum area and the sealing part, glass where the identification pattern is located can be prised to reduce the degree the substrate depressing inward during suction, and to reduce interference to a scan apparatus, thereby effectively identifying the identification pattern.

Figure 8:
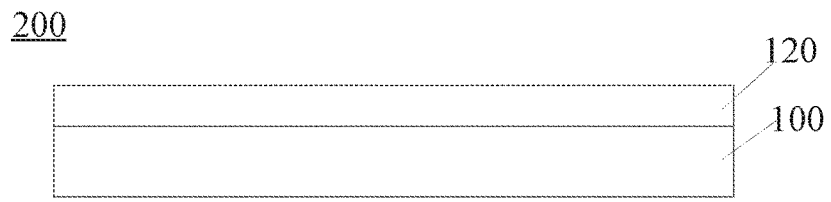
FIG. 8 is a structural schematic diagram of a display screen according to an embodiment of the present application.

As shown in FIG. 8, the present embodiment further provides a display screen 200 that includes any one of the above described display panels 100, and the display screen 200 can further include a touch control layer 120. In one embodiment, the touch control layer 120 can be disposed above the display panel 100, but a disposed position of the touch control layer 120 is not limited thereto.

Figure 9:
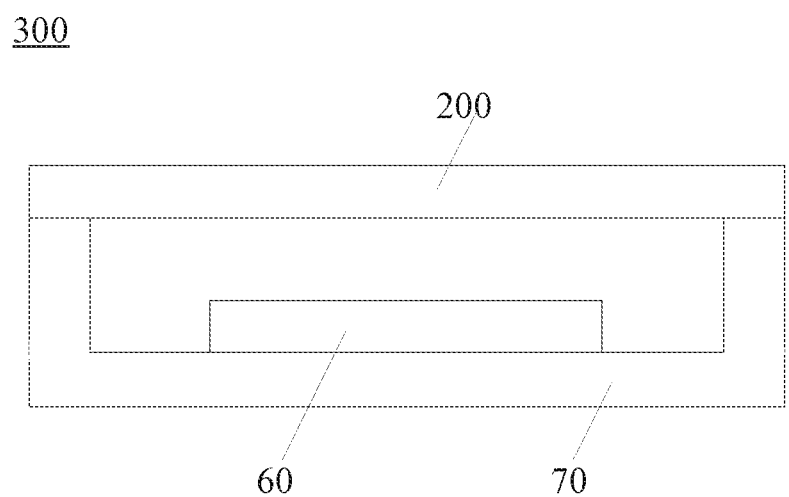
FIG. 9 is a structural schematic diagram of an electronic apparatus according to an embodiment of the present application.

Referring to FIG. 9, FIG. 9 is a structural schematic diagram of an electronic apparatus according to an embodiment of the present application. The electronic apparatus 300 can include a display screen 200, a control circuit 60, and a housing 70. It should be explained that contents of the electronic apparatus 300 shown in FIG. 9 are not limited thereto, and other devices can further be included, such as a camera, an antenna structure, fingerprint unlock module, etc.

Wherein, the display screen 200 is disposed on the housing 70.

In some embodiments, the display screen 200 can be secured to the housing 70, and the display screen 200 and the housing 70 form a sealed space to accommodate the control circuit 60 and other devices.

In some embodiments, the housing 70 can be made of flexible materials, such as a plastic housing or a silica gel housing.

Wherein, the control circuit 60 is installed in the housing 70, the control circuit 60 can be a mainboard of the electronic apparatus 300, and one, two, or more of functional components such as a battery, an antenna structure, a microphone, a speaker, an earphone interface, a universal serial bus interface, a camera, a distance sensor, an ambient light sensor, a receiver, a processor, etc. can be integrated in the control circuit 60.

Wherein, the display screen 200 is installed in the housing 70, meanwhile, the display screen 200 is electrically connected to the control circuit 60 to form a display surface of the electronic apparatus 300. The display screen 200 can include a display area and a non-display area. The display area can be configured to display pictures of the electronic apparatus 300 or for users to perform touch control, among others. The non-display area can be configured to dispose various functional components.

The electronic apparatus includes but not limited to a cellphone, a tablet, a computer display, a game console, a television, a display screen, a wearable apparatus, other daily appliances or household appliances with a display function, etc.

A display panel, a display screen, and an electronic apparatus according to embodiments of the present application include a first substrate that includes a first underlay substrate including a first sub-part; and a functional layer disposed on the first sub-part and including an identification pattern; a second substrate disposed opposite to the first substrate; a first limiting part and a second limiting part disposed between the first substrate and the second substrate, wherein the first limiting part is disposed on one of two sides of the identification pattern, the second limiting part is disposed on the other of the two sides of the identification pattern, and the first limiting part and the second limiting part are configured to limit the identification pattern within a preset region; a first sealing part disposed between the first limiting part and the second limiting part and disposed on a first side of the identification pattern; and a first vacuum area disposed on a second side of the identification pattern. Because a fulcrum effect occurs at an area between the first vacuum area and the first sealing part, glass where the identification pattern is located can be prised to reduce the degree the substrate depressing inward during suction, and to reduce interference to a scan apparatus, thereby effectively identifying the identification pattern.

A display panel, a display screen, and an electronic apparatus according to embodiments of the present application are described in detail above. Specific examples are used to explain principles and embodiments of the present application, and description of the above embodiments is merely to help understanding of the present application. Meanwhile, a person of ordinary skill in the art, according to spirit of the present application, would vary in specific embodiments and application ranges. In summary, contents of the specification should not be understood as limitation to the present application.

What is claimed is:

1. A display panel, comprising:
a first substrate comprising:
a first underlay substrate including a first sub-part; and
a functional layer disposed on the first sub-part and including an identification pattern;
a second substrate disposed opposite to the first substrate;
a first limiting part and a second limiting part disposed between the first substrate and the second substrate, wherein the first limiting part is disposed on one of two sides of the identification pattern, the second limiting part is disposed on the other of the two sides of the identification pattern, and the first limiting part and the second limiting part are configured to limit the identification pattern within a preset region;
a first sealing part disposed between the first limiting part and the second limiting part and disposed on a first side of the identification pattern; and
a first vacuum area disposed on a second side of the identification pattern.

2. The display panel as claimed in claim 1, comprising:
a second sealing part disposed between the first limiting part and the second limiting part and further disposed between the identification pattern and the first vacuum area.

3. The display panel as claimed in claim 2, comprising:
a second vacuum area disposed on a side of the first sealing part away from the identification pattern.

4. The display panel as claimed in claim 3, wherein the first vacuum area and the second vacuum area are symmetrically disposed with respect to the identification pattern, and the first sealing part and the second sealing part are symmetrically disposed with respect to the identification pattern.

5. The display panel as claimed in claim 3, wherein a sum of an area of the second vacuum area and an area of the first vacuum area is equal to an area of the identification pattern.

6. The display panel as claimed in claim 2, wherein a distance between the second sealing part and the identification pattern and a distance between the first sealing part and the identification pattern are both less than a first preset value.

7. The display panel as claimed in claim 1, comprising:
a third limiting part disposed between the first substrate and the second substrate and further disposed on one side of the second limiting part away from the identification pattern; and
a third vacuum area disposed between the third limiting part and the second limiting part, wherein a position of the third vacuum area corresponds to a position of the identification pattern.

8. The display panel as claimed in claim 7, wherein a difference between an area of the third vacuum area and an area of the identification pattern is less than a preset area.

9. The display panel as claimed in claim 1, wherein a distance between the third limiting part and the second limiting part is greater than or equal to a distance between the first limiting part and the second limiting part.

10. The display panel as claimed in claim 1, wherein a material of the first sealing part and a material of the second sealing part are both a colloid.

11. A display screen, comprising a display panel, wherein the display panel comprises:
   a first substrate comprising:
      a first underlay substrate including a first sub-part; and
      a functional layer disposed on the first sub-part and including an identification pattern;
   a second substrate disposed opposite to the first substrate;
   a first limiting part and a second limiting part disposed between the first substrate and the second substrate, wherein the first limiting part is disposed on one of two sides of the identification pattern, the second limiting part is disposed on the other of the two sides of the identification pattern, and the first limiting part and the second limiting part are configured to limit the identification pattern within a preset region;
   a first sealing part disposed between the first limiting part and the second limiting part and disposed on a first side of the identification pattern; and
   a first vacuum area disposed on a second side of the identification pattern.

12. The display screen as claimed in claim 11, comprising:
   a second sealing part disposed between the first limiting part and the second limiting part and further disposed between the identification pattern and the first vacuum area.

13. The display screen as claimed in claim 12, comprising:
   a second vacuum area disposed on a side of the first sealing part away from the identification pattern.

14. The display screen as claimed in claim 13, wherein the first vacuum area and the second vacuum area are symmetrically disposed with respect to the identification pattern, and the first sealing part and the second sealing part are symmetrically disposed with respect to the identification pattern.

15. The display screen as claimed in claim 13, wherein a sum of an area of the second vacuum area and an area of the first vacuum area is equal to an area of the identification pattern.

16. The display screen as claimed in claim 12, wherein a distance between the second sealing part and the identification pattern and a distance between the first sealing part and the identification pattern are both less than a first preset value.

17. The display screen as claimed in claim 11, comprising:
   a third limiting part disposed between the first substrate and the second substrate and further disposed on one side of the second limiting part away from the identification pattern; and
   a third vacuum area disposed between the third limiting part and the second limiting part, wherein a position of the third vacuum area corresponds to a position of the identification pattern.

18. The display screen as claimed in claim 17, wherein a difference between an area of the third vacuum area and an area of the identification pattern is less than a preset area.

19. The display screen as claimed in claim 11, wherein a distance between the third limiting part and the second limiting part is greater than or equal to a distance between the first limiting part and the second limiting part.

20. An electronic apparatus, comprising the display screen as claimed in claim 11.

* * * * *